United States Patent
Kawamura et al.

(10) Patent No.: US 11,775,688 B2
(45) Date of Patent: Oct. 3, 2023

(54) INFORMATION PROCESSING DEVICE AND INFORMATION PROCESSING METHOD

(71) Applicant: FeliCa Networks, Inc., Tokyo (JP)

(72) Inventors: Seiji Kawamura, Tokyo (JP); Yasumasa Nakatsugawa, Kanagawa (JP)

(73) Assignee: FELICA NETWORKS, INC., Tokyo (JP)

(*) Notice: Subject to any disclaimer, the term of this patent is extended or adjusted under 35 U.S.C. 154(b) by 170 days.

(21) Appl. No.: 16/772,577

(22) PCT Filed: Oct. 31, 2018

(86) PCT No.: PCT/JP2018/040492
§ 371 (c)(1),
(2) Date: Jun. 12, 2020

(87) PCT Pub. No.: WO2019/123851
PCT Pub. Date: Jun. 27, 2019

(65) Prior Publication Data
US 2020/0387638 A1    Dec. 10, 2020

(30) Foreign Application Priority Data
Dec. 20, 2017 (JP) .................. 2017-243486

(51) Int. Cl.
*G06F 21/64* (2013.01)
(52) U.S. Cl.
CPC .................. *G06F 21/64* (2013.01)

(58) Field of Classification Search
CPC .................. G06F 21/64; G06F 21/604; G06F 2221/2151; G06F 21/71; G06F 21/602
See application file for complete search history.

(56) References Cited

U.S. PATENT DOCUMENTS

| | | | | |
|---|---|---|---|---|
| 5,894,450 A | * | 4/1999 | Schmidt | H04B 13/02 367/133 |
| 8,050,881 B1 | * | 11/2011 | Yeung | A61B 5/1126 370/510 |
| 10,740,334 B1 | * | 8/2020 | Afghani | G06F 16/2455 |
| 10,846,760 B2 | * | 11/2020 | Taniuchi | G06Q 30/0277 |
| 10,958,716 B2 | * | 3/2021 | Yamazaki | G06F 9/505 |
| 2010/0063996 A1 | * | 3/2010 | Kanemura | G06F 21/445 709/224 |
| 2010/0122056 A1 | * | 5/2010 | Gerber | G06F 21/79 711/E12.001 |

(Continued)

FOREIGN PATENT DOCUMENTS

| | | |
|---|---|---|
| EP | 0417817 A2 | 3/1991 |
| JP | 2008245620 A | 10/2008 |

(Continued)

*Primary Examiner* — Khalid M Almaghayreh
(74) *Attorney, Agent, or Firm* — Paratus Law Group, PLLC

(57) ABSTRACT

There is provided an information processing device to grasp timing of a process by a protection storage unit and to effectively utilize the timing, the information processing device including a data obtaining unit that, on the basis of a notification from a protection storage unit, obtains data related to timing of a process by the protection storage unit, and a control unit that associates the data related to the timing of the process with data related to the process.

17 Claims, 8 Drawing Sheets

(56) References Cited

U.S. PATENT DOCUMENTS

| | | | | |
|---|---|---|---|---|
| 2011/0239004 | A1* | 9/2011 | Hayashi | H04L 9/3263 713/189 |
| 2012/0317066 | A1* | 12/2012 | Miyazaki | G06Q 50/10 706/46 |
| 2013/0185816 | A1* | 7/2013 | Maeda | G06F 21/604 726/30 |
| 2014/0297852 | A1* | 10/2014 | Shimizu | G06F 11/3006 709/224 |
| 2014/0298368 | A1* | 10/2014 | Raman | H04L 9/3228 725/25 |
| 2014/0350708 | A1* | 11/2014 | Kobayashi | G06Q 10/06 700/108 |
| 2015/0348008 | A1* | 12/2015 | Khan | G06Q 20/322 705/44 |
| 2016/0210306 | A1* | 7/2016 | Kumarasamy | G06F 16/178 |
| 2016/0217398 | A1* | 7/2016 | Unuma | G06Q 10/06 |
| 2016/0359701 | A1* | 12/2016 | Pang | G06N 20/00 |
| 2017/0150433 | A1* | 5/2017 | Masuda | H04W 24/08 |
| 2017/0217446 | A1* | 8/2017 | Halder | G05D 1/021 |
| 2017/0279582 | A1* | 9/2017 | Lee | H04L 27/26136 |
| 2018/0126901 | A1* | 5/2018 | Levkova | G06V 20/597 |
| 2019/0025873 | A1* | 1/2019 | Goodrich | H04L 63/0807 |
| 2019/0065735 | A1* | 2/2019 | Ogura | G06F 21/604 |
| 2020/0192916 | A1* | 6/2020 | Kashiwagi | G06F 16/285 |
| 2021/0097109 | A1* | 4/2021 | Lei | G06F 16/9035 |

FOREIGN PATENT DOCUMENTS

| | | |
|---|---|---|
| JP | 2013126188 A | 6/2013 |
| JP | 2015060444 A | 3/2015 |

* cited by examiner

FIG. 4

SECOND STORAGE UNIT 123

| No | PATH | PROCESS TARGET DATA | HASH VALUE |
|---|---|---|---|
| 1 | AREA A/SERVICE A/USER BLOCK DATA A-1 | DATA A | 2D35FA···93CF |
| 2 | AREA A/SERVICE A/USER BLOCK DATA A-2 | DATA B | A157C8···BB3A |
| 3 | AREA A/SERVICE A/USER BLOCK DATA A-2 | DATA C | 7DC80F···ABFF |
| ... | ... | ... | ... |

FIG. 5

| No | PATH | PROCESS TARGET DATA | HASH VALUE | TIMING | POSITION | USER | ... |
|---|---|---|---|---|---|---|---|
| 1 | AREA A/ ... | DATA A | 2D35FA... | 2017/11/13 13:41 | (35.308,139.492) | USER A | ... |
| 2 | AREA A/ ... | DATA B | A157C8... | 2017/11/13 13:50 | (35.311,139.489) | USER A | ... |
| 3 | AREA A/ ... | DATA C | 7DC80F... | 2017/11/13 14:02 | (35.307,139.502) | USER A | ... |
| ... | ... | ... | ... | ... | ... | ... | ... |

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2018/040492 (filed on Oct. 31, 2018) under 35 U.S.C. =which claims priority to Japanese Patent Application No. 2017-243486 (filed on Dec. 20, 2017), which are all hereby incorporated by reference in their entirety.

TECHNICAL FIELD

The present disclosure relates to an information processing device and an information processing method.

BACKGROUND ART

Among mobile phone terminals including smartphones, terminals have been developed that have a short-range (proximity) wireless communication function by including a non-contact integrated circuit (IC) tag, a radio frequency identification (RFID) tag, or the like and are capable of performing wireless communication with a reader-writer in a proximity of about, for example, several centimeters. For example, a secure element included in the non-contact IC tag performs an arbitrary process along with short-range wireless communication, and thus the mobile phone terminal can implement a transportation ticket function, an electronic money function, a credit card function, and an individual authentication card function.

Furthermore, techniques for effectively utilizing data used in processing of these various functions have been also developed. For example, Patent Document 1 below discloses a technique to associate history data of a price settlement process and data input separately by a user in a case where the price settlement process is performed through the short-range wireless communication, so as to effectively utilize the data.

CITATION LIST

Patent Document

Patent Document 1: Japanese Patent Application Laid-Open No. 2008-141400

SUMMARY OF THE INVENTION

Problems to be Solved by the Invention

However, depending on the technique or the like described in Patent Document 1, the mobile phone terminal cannot grasp and effectively utilize timing of a process by the secure element (protection storage unit). More specifically, the secure element cannot access a time obtaining function provided in the mobile phone terminal (or an external device connected to the mobile phone terminal), and thus cannot record data related to timing of a process. Therefore, even if the mobile phone terminal obtains data related to a process from the secure element after the process, data related to timing of the process is not included in the obtained data, and thus the mobile phone terminal cannot grasp and effectively utilize timing of the process by the secure element.

Accordingly, the present disclosure has been made in view of the above, and the present disclosure provides a novel and improved information processing device and information processing method that enable an information processing device such as a mobile phone terminal to grasp and effectively utilize timing of a process by a protection storage unit such as a secure element.

Solutions to Problems

According to the present disclosure, there is provided an information processing device including a data obtaining unit that, on the basis of a notification from a protection storage unit, obtains data related to timing of a process by the protection storage unit, and a control unit that associates the data related to the timing of the process with data related to the process.

Furthermore, according to the present disclosure, there is provided an information processing method executed by a computer, the method including, on the basis of a notification from a protection storage unit, obtaining data related to timing of a process by the protection storage unit, and associating the data related to the timing of the process with data related to the process.

Effects of the Invention

As described above, according to the present disclosure, it is possible for an information processing device to grasp timing of a process performed by a protection storage unit and to effectively utilize the timing.

Note that the above effects are not necessarily limited, and any of the effects illustrated in the present description or other effects that can be grasped from the present description may be exhibited together with or in place of the above effects.

BRIEF DESCRIPTION OF DRAWINGS

FIG. 4 is a diagram illustrating an example of data stored in a second storage unit 123.

FIG. 5 is a diagram illustrating an example of data stored in a storage unit 113.

MODE FOR CARRYING OUT THE INVENTION

Figure 1:
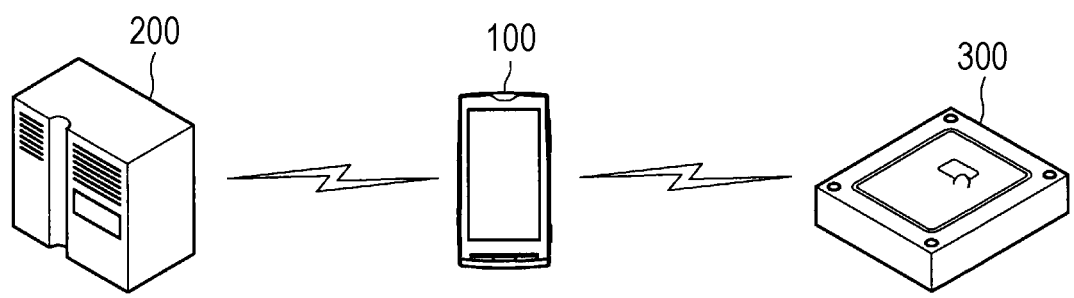
FIG. 1 is a diagram illustrating a configuration example of an information processing system according to the present embodiment.

Hereinafter, preferred embodiments of the present disclosure will be described in detail with reference to the accompanying drawings. Note that in the present description and drawings, for components which have substantially the same functional configurations, duplicated descriptions are omitted by attaching the same reference signs.

Note that the description will be made in the following order.

1. Background
2. Embodiment
2.1. System configuration example
2.2. Functional configuration example of secure element 120
2.3. Functional configuration example of device host 110
2.4. Examples of process flows
2.5. Hardware configuration example of information processing device 100
3. Summary

1. BACKGROUND

First, the background of the present disclosure will be described.

As described above, in a mobile phone terminal including a smartphone, for example, a secure element provided in a non-contact IC tag performs an arbitrary process along with short-range wireless communication. Thus, the mobile phone terminal can implement a ticket function of transportation system, an electronic money function, a credit card function, and a personal authentication card function.

Here, the secure element cannot obtain and record data related to timing of a process (for example, data on date and time when the process has been performed, and the like). More specifically, the secure element cannot access a time obtaining function provided in the mobile phone terminal (or an external device connected to the mobile phone terminal), and thus cannot obtain the data related to timing of a process. Therefore, the secure element cannot store the data related to timing of a process in association with process target data.

Furthermore, for the secure element, there is data that cannot be obtained other than the data related to timing of a process. For example, since the secure element cannot access various sensors or various devices provided outside the secure element, it is not possible to obtain data related to the position of the mobile phone terminal when a process is performed, data related to the situation surrounding the position, data related to a user of the mobile phone terminal, or data related to operation of the mobile phone terminal or action of the user, or the like. Therefore, the secure element cannot store these data in association with process target data.

Furthermore, a process performed between the secure element and the external device by the short-range wireless communication is basically completed between the secure element and the external device, and thus a device host provided in the mobile phone terminal cannot know contents of the process.

Furthermore, in a case where an update process of data stored in the secure element has been performed, even if the device host obtains process target data stored in the secure element, there are cases where the device host cannot know the contents of the update process. For example, in a case where the update process of data stored in the secure element has been performed a plurality of times before the device host obtains the process target data, the device host cannot grasp the contents of each update process.

In view of the above circumstances, the discloser of the present application has created the technology of the present disclosure. Hereinafter, an embodiment of the present disclosure will be described.

2. Embodiment

The background of the present disclosure has been described above. Next, an embodiment of the present disclosure will be described.

2.1. System Configuration Example

First, a configuration example of an information processing system according to the present embodiment will be described with reference to FIGS. 1 and 2.

As illustrated in FIG. 1, the information processing system according to the present embodiment includes an information processing device 100, a server 200, and a reader-writer 300. Furthermore, as illustrated in FIG. 2, the information processing device 100 includes a device host 110, a secure element 120, and a contactless front end (CLF) 130.

(Information Processing Device 100)

The information processing device 100 is a device that can perform telephone calls and data transmission and reception by performing wireless communication with a predetermined base station. Furthermore, the information processing device 100 includes a built-in non-contact IC tag, and performs non-contact communication (for example, short-range wireless communication or the like) by using the non-contact IC tag with the reader-writer 300 installed at a predetermined place (for example, a store, a ticket gate, an entrance, or the like), to thereby perform various processes. Note that the contents of the processes are not particularly limited. For example, the information processing device 100 can perform a price settlement process, an electronic money charge process, an individual authentication process, a behavior management process, or the like using the non-contact IC tag. Furthermore, the communication method between the information processing device 100 and the reader-writer 300 is not particularly limited. For example, the communication method between the information processing device 100 and the reader-writer 300 may be contact communication instead of the non-contact communication.

Furthermore, the information processing device 100 can also transmit and receive data by communicating with the server 200. For example, the information processing device 100 can transmit history data and the like of the price settlement process to the server 200. Further, by receiving data related to charged electronic money from the server 200, the information processing device 100 can reflect the data on the own device. Note that the contents of data transmitted and received between the information processing device 100 and the server 200 are not particularly limited. Furthermore, the communication method between the information processing device 100 and the server 200 is not particularly limited.

Furthermore, although the above description has been made on the assumption that the information processing device 100 is a mobile phone terminal including a smartphone, the type of the information processing device 100 is not limited thereto. For example, the information processing device 100 may be any one of information processing devices including a general-purpose computer, a personal computer (PC), a laptop PC, a tablet PC, any wearable terminal, a portable media playback device, a portable game device, and the like.

(Device Host 110)

The device host 110 is an information processing device that includes an integrated circuit including a central processing unit (CPU), a read only memory (ROM), a random access memory (RAM), and the like. Then, the device host 110 executes various processes and the like by an operating system using one or two or more programs stored in the ROM. Examples of the operating system include, but are not limited to, Android (registered trademark), iOS, Windows (registered trademark), and the like.

(Secure Element 120)

The secure element 120 is a functional configuration that functions as a protection storage unit. More specifically, the secure element 120 is a security module having tamper resistance (for example, a security chip or the like) and can protect data stored in a storage unit (for example, a memory or the like) provided in itself, access to the storage unit, a process executed by itself, and the like. Moreover, the secure element 120 has an encryption function, and can encrypt important data and store it in the storage unit.

Furthermore, the secure element 120 can perform an arbitrary process along with short-range wireless communication with an external device. For example, the secure element 120 can read data from the storage unit provided in itself or update data in response to a request from an external device. Note that the process by the secure element 120 is not limited thereto. For example, the secure element 120 may execute an arbitrary process along with communication with the server 200 or the device host 110. For example, the secure element 120 may read data from the storage unit provided in itself or update data in response to a request from the server 200.

The secure element 120 may be provided in a subscriber identity module (SIM) card or the like in the information processing device 100, but is not limited thereto. For example, the secure element 120 may be provided in any configuration other than the SIM card in the information processing device 100, or may be provided in any device other than the information processing device 100 (for example, the server 200 or the like).

(CLF 130)

The CLF 130 is also called a near field communication (NFC) controller, and performs communication with the reader-writer 300 based on NFC standards. More specifically, the CLF 130 transmits and receives data to and from the reader-writer 300 existing within a communicable range (range of 0 to 10 cm) by short-range wireless communication. For example, in a case where the CLF 130 has received a wireless signal from the reader-writer 300, the CLF 130 provides data included in the wireless signal to the device host 110 or the secure element 120. Furthermore, the CLF 130 generates a wireless signal for transmission using data provided from the device host 110 or the secure element 120, and transmits the wireless signal to the reader-writer 300. Note that the CLF 130 may be replaced with another configuration having a function similar to the above.

(Server 200)

The server 200 is a server that manages the information processing device 100 or a service and the like provided through the information processing device 100. The server 200 performs various processes along with predetermined communication with the information processing device 100. For example, the server 200 receives various data stored in the secure element 120 from the information processing device 100. Then, the server 200 outputs action history data, preference data, and the like of the user using the information processing device 100 by accumulating the data and performing statistical analysis, and provides various services on the basis of these data. Note that processes performed by the server 200 or contents of services provided are not particularly limited. Furthermore, the communication method between the server 200 and the information processing device 100 is not particularly limited.

(Reader-Writer 300)

The reader-writer 300 is an information processing device that performs short-range wireless communication with the information processing device 100 when the information processing device 100 is held over it by the user. Furthermore, although not illustrated, the reader-writer 300 can also communicate with an arbitrary information processing device (a device other than the information processing device 100). For example, when the reader-writer 300 is connected to an arbitrary information processing device provided in a store (hereinafter, referred to as a "store device"), various data obtained from the information processing device 100 (for example, identification data of the information processing device 100, electronic money data or coupon data, and the like) can be provided to the store device, or various data provided from the store device (for example, receipt data and the like) can be provided to the information processing device 100.

Note that the communication method between the reader-writer 300 and the information processing device 100 is assumed to be short-range wireless communication, but is not limited thereto. For example, the communication method between the reader-writer 300 and the information processing device 100 may be any non-contact communication method including Wireless Fidelity (Wi-Fi) or Bluetooth (registered trademark) and the like, or may be an arbitrary non-contact contact communication method. Furthermore, the communication method between the reader-writer 300 and the store device is not particularly limited.

2.2. Functional Configuration Example of Secure Element 120

The configuration example of the information processing system according to the present embodiment has been described above. Next, a functional configuration example of the secure element 120 will be described.

Figure 2:
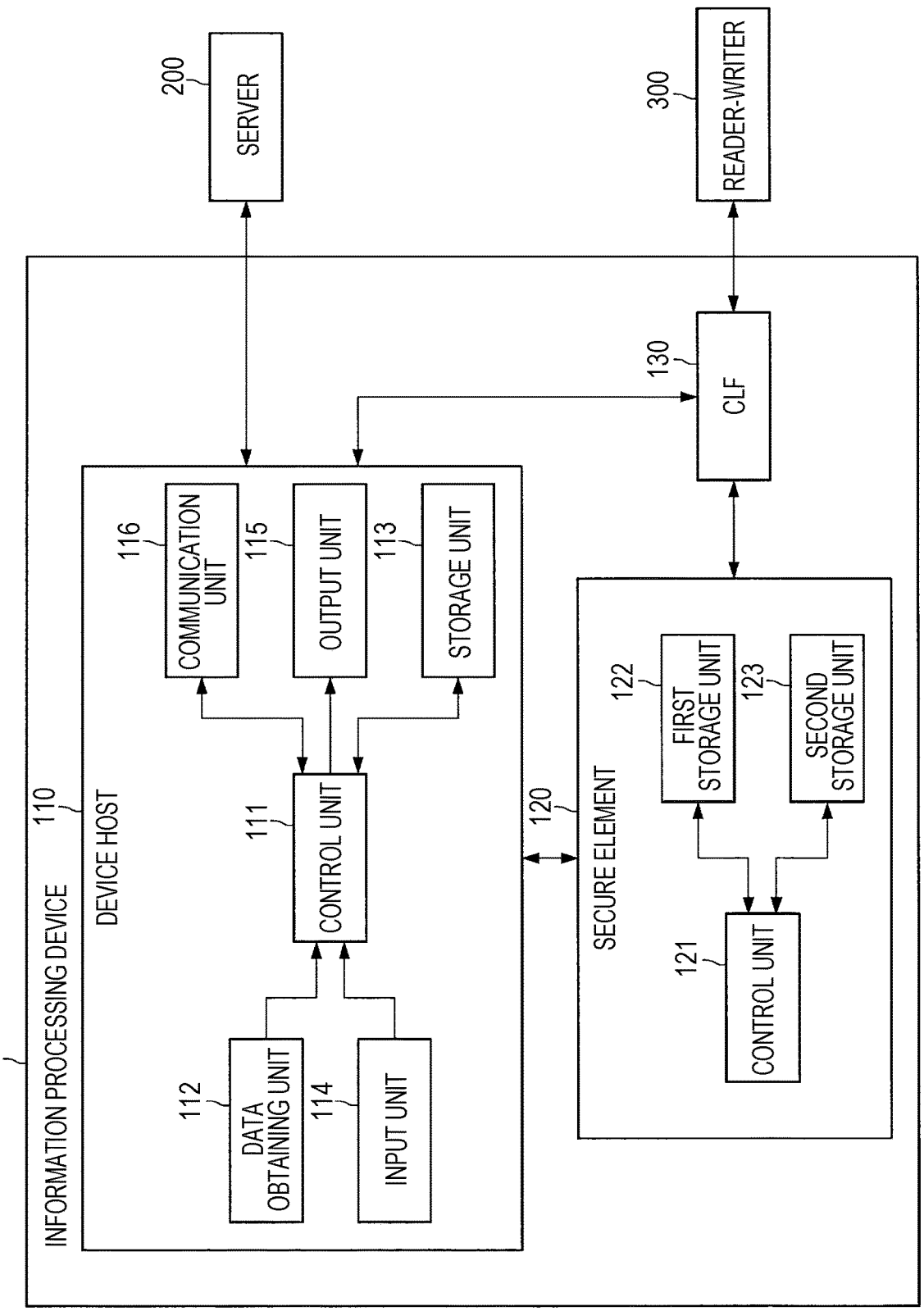
FIG. 2 is a block diagram illustrating a functional configuration example of an information processing device 100.

As illustrated in FIG. 2, the secure element 120 includes a control unit 121, a first storage unit 122, and a second storage unit 123.

(First Storage Unit 122)

The first storage unit 122 is a storage area that can be accessed on the basis of control by the control unit 121, and can prevent tampering of data and the like by an external device by eliminating direct access from the external device. Furthermore, the first storage unit 122 is also a storage area for storing data used for processing by the control unit 121. More specifically, the first storage unit 122 stores process target data, programs, or setting files, and the like used for processing by the control unit 121.

Figure 3:
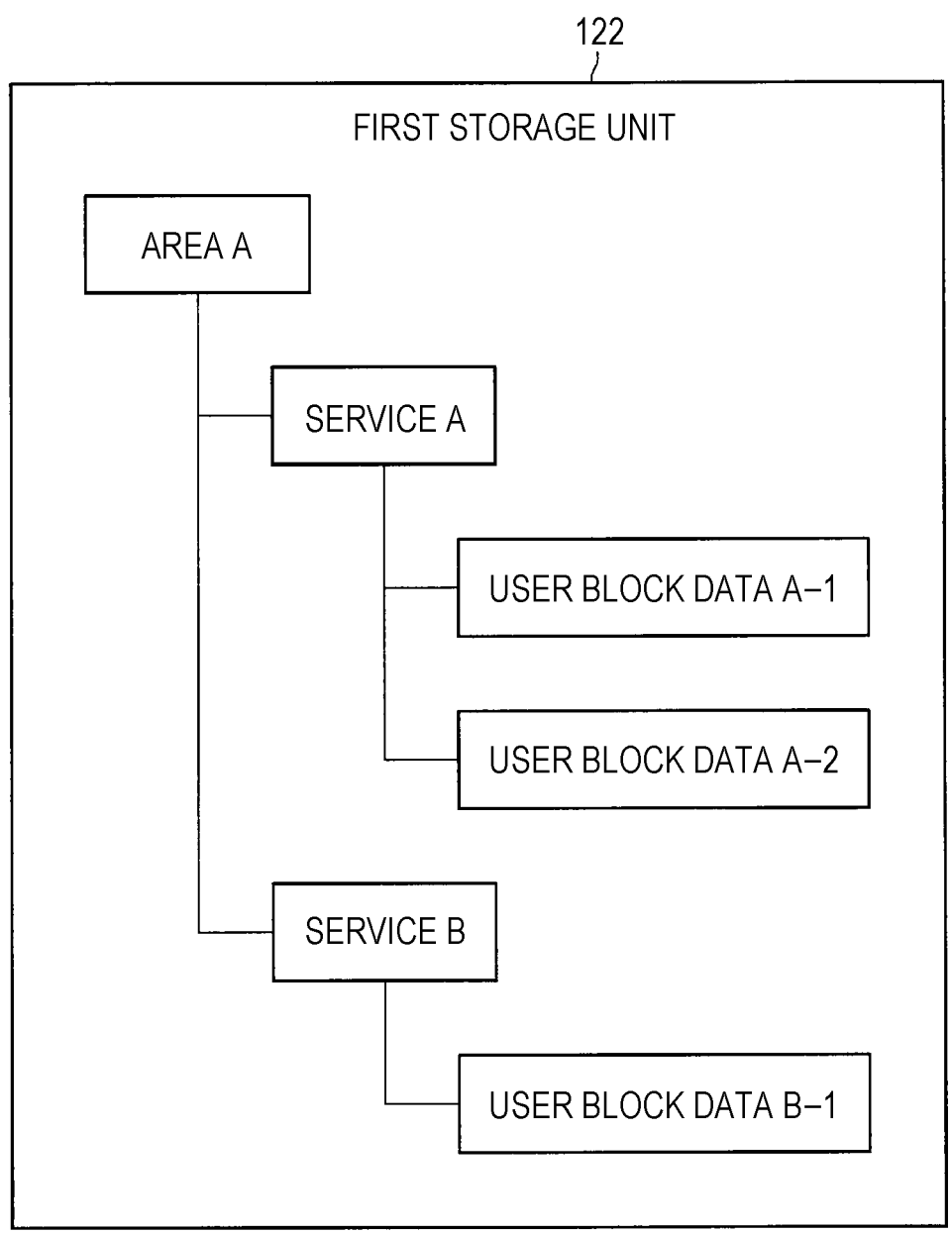
FIG. 3 is a diagram illustrating a data structure included in a first storage unit 122.

Here, a data structure that the first storage unit 122 has will be described with reference to FIG. 3. As illustrated in FIG. 3, the first storage unit 122 manages data according to a predetermined hierarchical structure. More specifically, the first storage unit 122 manages data in a unit of "area", "service", or "user block data". The "area" is also called a directory and is a concept of bundling data under the directory, and a plurality of areas can exist in one hierarchical structure. The area is basically formed in units of information processing systems, and thus a plurality of areas can be formed in a case where the secure element 120 corresponds to a plurality of information processing systems. However, without being limited thereto, a plurality of areas may be formed in one information processing system, or one area may be shared by a plurality of information processing systems.

The "service" is a concept for managing an access right to data, an encryption method, and the like. More specifically, data stored under the service is controlled based on an access right or an encryption method defined for the service, or the like. For example, it is assumed that a service A in FIG. 3 stores unencrypted data, and a service B stores data encrypted by a predetermined encryption method. In this case, user block data A-1 and user block data A-2, which are data of relatively low importance, can be stored under the service A without being encrypted. On the other hand, user block data B-1, which is data of relatively high importance, can be encrypted by the encryption method defined by the service B and stored under the service B. A plurality of services can exist in one hierarchical structure.

The "user block data" is a storage area for storing data used for processing by the secure element 120 or is data itself, and a plurality of pieces of user block data may exist in one hierarchical structure.

Note that the data structure of the first storage unit 122 is not limited to the above. For example, the data structure of the first storage unit 122 may be implemented by another concept corresponding to "area", "service", or "user block data".

(Control Unit 121)

The control unit 121 is a functional configuration that comprehensively controls overall processing performed by the secure element 120. More specifically, in a case where request information from an external device is received by CLF 130 through the short-range wireless communication between the information processing device 100 and the external device, the control unit 121 performs a process based on the request information. For example, the control unit 121 performs reading or updating or the like of data stored in the first storage unit 122 (for example, data in the user block data, or the user block data itself) on the basis of the request information. Note that processes controlled by the control unit 121 are not limited to the above. For example, the control unit 121 may control an arbitrary process along with communication with the server 200 or the device host 110.

Then, after the above process is completed, the control unit 121 stores data related to the process in the second storage unit 123. More specifically, the control unit 121 stores process target data stored in first storage unit 122 after the process in the second storage unit 123.

Here, an example of data stored by the control unit 121 in the second storage unit 123 will be described with reference to FIG. 4. The control unit 121 stores process target data and a path of the process target data in the first storage unit 122 in the second storage unit 123 as illustrated in FIG. 4. Moreover, the control unit 121 calculates a hash value of the process target data, and stores the hash value together in the second storage unit 123.

In this way, the device host 110 can appropriately know the contents of the process by obtaining these data from the second storage unit 123. For example, even if an update process of data in the first storage unit 122 is performed a plurality of times before the device host 110 obtains these data, all the process target data are stored in the second storage unit 123 without being overwritten, and thus the device host 110 can obtain these data from the second storage unit 123, and can appropriately know the contents of all processes (in other words, the technology of the present disclosure is particularly effective in a case where an update process of data occurs frequently). Furthermore, the device host 110 can calculate a hash value using the obtained process target data and confirm that the hash value matches a hash value obtained from the second storage unit 123, to thereby verify integrity of the process target data. For example, as an example in which the server 200 verifies integrity of data obtained from the second storage unit 123 in the secure element 120, verification using a message authentication code (MAC) or an electronic signature, or the like is conceivable.

Note that the data stored in the second storage unit 123 by the control unit 121 is not limited to the above. More specifically, the control unit 121 may appropriately omit part of the data illustrated in FIG. 4. For example, the control unit 121 may omit a path, a hash value, or the like. Furthermore, the control unit 121 may appropriately add data other than the data illustrated in FIG. 4. For example, the control unit 121 may add data related to an attribute (for example, contents, type of importance, or the like) of the process target data. Furthermore, the control unit 121 may replace data illustrated in FIG. 4 with another data corresponding thereto. For example, the control unit 121 may replace a path of process target data with any data that can specify the process target data. Furthermore, the control unit 121 may calculate a hash value including not only process target data but also data other than the process target data (for example, a path of the process target data). Thus, the device host 110 can verify integrity of data including not only the process target data but also data other than the process target data.

Furthermore, the control unit 121 does not always store data related to a process in the second storage unit 123 after the process ends, and can control whether or not to store the data related to the process in the second storage unit 123.

For example, the control unit 121 can control whether or not to store data related to a process in the second storage unit 123 on the basis of the contents of the process. More specifically, in a case where the contents of a process include update of data stored in the first storage unit 122, the control unit 121 may store data related to the process in the second storage unit 123, as described above. On the other hand, for example, in a case where the contents of a process include only reading of data stored in the first storage unit 122, the control unit 121 does not need to store data related to the process in the second storage unit 123. In other words, in a case where the contents of a process include only reading of data, the data will not be changed, and thus the device host 110 does not need to know the process target data of the process (or may have already grasped the process target data) in some cases. Thus, the control unit 121 does not need to store the data related to the process in the second storage unit 123.

Furthermore, the control unit 121 may control whether or not to store data related to a process in the second storage unit 123 on the basis of a storage area in which process target data is stored. More specifically, in a case where process target data is stored under a service for encrypted data in the data structure illustrated in FIG. 3, the control unit 121 determines that the importance of the process target data is relatively high, and does not need to store data related to the process in the second storage unit 123. In other words, the control unit 121 may control whether or not to store the data related to the process in the second storage unit 123 on the basis of presence or absence of encryption of the process target data (or some index value indicating importance).

With the above control, the control unit 121 can reduce waste of the amount of data stored in the second storage unit 123. Note that the method of controlling whether or not to store data related to a process in the second storage unit 123 is not limited to the above. Furthermore, the example in which the control unit 121 performs a process using the data in the first storage unit 122, and then stores data related to the process in the second storage unit 123, has been described above. However, timing when the control unit 121 stores data related to a process in the second storage unit 123 is not limited thereto. For example, the control unit 121 may store data related to a process in the second storage unit 123 during the process. Furthermore, the control unit 121 may store data related to a process in a storage unit outside the secure element 120. For example, the control unit 121 may store data related to a process in the storage unit 113 of the device host 110. This makes it possible to omit the process in which the device host 110 obtains data related to a process from the second storage unit 123.

In addition, in a case where the control unit 121 has performed a process using data in the first storage unit 122, the control unit 121 notifies the device host 110 of an end of process at the timing when the process has ended. Thus, the device host 110 can recognize the timing when the process has ended. Note that the timing when a process has ended may refer to timing when carrier waves from the reader-writer 300 are no longer received, or may refer to timing when the control unit 121 recognizes that a series of processes has all ended. Here, since processing time by the control unit 121 is short (for example, less than one second to several seconds), the timing when a process has ended may be interpreted as "timing when a process has been performed". In other words, the notification enables the device host 110 to recognize timing when a process has been performed. The device host 110 can obtain the data related to the process stored in the second storage unit 123 when being triggered by recognition of the timing when the process has been performed. Details will be described later.

Note that the timing when the control unit 121 performs the notification is not limited to the above. For example, the control unit 121 may notify the device host 110 at timing when a process has been started. Note that the timing when a process has been started may refer to timing when carrier waves from the reader-writer 300 have been detected, or may refer to timing when a series of processes has been started by the control unit 121. As described above, since processing time by the control unit 121 is short, the timing when a process has been started may be interpreted as "timing when a process has been performed". In this case, after having received the notification, the device host 110 attempts to obtain the data at timing when it is expected that the data related to the process has been stored in the second storage unit 123. Details will be described later.

Furthermore, the control unit 121 may notify the device host 110 at timing when execution of a process is expected. For example, after a user authentication process is performed by a predetermined method (for example, biometric authentication such as fingerprint authentication, iris authentication, or vein authentication, password authentication, or the like), there is a possibility that an arbitrary process including a price settlement process is performed. Therefore, in a case where the control unit 121 is notified by the device host 110 or the like that the user authentication process has succeeded, the control unit 121 may give the above notification to the device host 110.

Furthermore, the control unit 121 does not always notify the device host 110 in a case where the control unit 121 performs a process using data of the first storage unit 122, and whether or not to notify the device host 110 can be controlled. For example, in a case where the control unit 121 does not store data related to a process in the second storage unit 123, there is no data to be obtained by the device host 110 in the second storage unit 123, and thus the control unit 121 does not need to notify the device host 110. Note that the method of controlling notification to the device host 110 is not limited thereto.

Furthermore, the notification may not only transmit timing when a process has been performed (or timing when a process has ended or timing when a process has been started), or the like, but may also transmit other data, depending on the notification timing (in other words, the contents of the notification are not particularly limited). For example, the notification may include data related to the contents of a process (for example, type of importance of the process, or the like), so as to transmit the data to the device host 110. Thus, the device host 110 can control a process of obtaining data from the second storage unit 123, or the like on the basis of the data included in the notification.

Then, in a case where the device host 110 has requested to obtain data from the second storage unit 123 on the basis of the notification, the control unit 121 obtains data from the second storage unit 123 in response to the request, and provides the data to the device host 110. At this time, the control unit 121 deletes data that has been provided to the device host 110 from the second storage unit 123. Thus, the control unit 121 can increase free spaces of the second storage unit 123. Note that the timing when the control unit 121 deletes the data stored in the second storage unit 123 (in other words, a data retention period of the second storage unit 123) is not limited thereto.

Note that the contents of control by the control unit 121 is not limited to the above. For example, the control unit 121 may control a process generally performed in any one of information processing devices including a general-purpose computer, a PC, a laptop PC, a tablet PC, any wearable terminal, a portable media playback device, a portable game device, and the like.

(Second Storage Unit 123)

The second storage unit 123 is a storage area that stores data related to the process described with reference to FIG. 4. More specifically, as illustrated in FIG. 4, the second storage unit 123 stores process target data, a path of the process target data in the first storage unit 122, a hash value of the process target data, and the like. Note that the number, data structure, and the like of the second storage unit 123 are not particularly limited.

The functional configuration example of the secure element 120 has been described above. Note that the above functional configuration described with reference to FIG. 2 is merely an example, and the functional configuration of the secure element 120 is not limited to this example. Furthermore, the functional configuration of the secure element 120 can be flexibly transformed according to specifications and operation.

2.3. Functional Configuration Example of Device Host 110

In the foregoing, the functional configuration example of the secure element 120 has been described. Next, a functional configuration example of the device host 110 will be described.

As illustrated in FIG. 2, the device host 110 includes a control unit 111, a data obtaining unit 112, a storage unit 113, an input unit 114, an output unit 115, and a communication unit 116.

(Data Obtaining Unit 112)

The data obtaining unit 112 is a functional configuration that obtains data related to a process stored in the second storage unit 123 in response to a notification provided from the control unit 121 of the secure element 120. More specifically, in a case where the data obtaining unit 112 has received a notification from the control unit 121, the data obtaining unit 112 generates request information of data related to a process and provides the request information to the control unit 121. Thus, the control unit 121 obtains all data related to the process stored in the second storage unit 123, provides the data to the data obtaining unit 112, and deletes the data stored in the second storage unit 123. Note that this is only an example, and the data obtaining unit 112 may obtain only a part of the data related to the process stored in the second storage unit 123. For example, the data obtaining unit 112 grasps the contents of data stored in the second storage unit 123 by some method (for example, index information of the second storage unit 123, or information included in the notification, or the like), and may obtain necessary data or data with higher importance preferentially. Furthermore, even when there is no notification from the control unit 121, the data obtaining unit 112 may spontaneously attempt to obtain data related to a process from the second storage unit 123.

Furthermore, the data obtaining unit 112 obtains data related to timing of a process by the secure element 120 from outside the secure element 120 according to the notification provided from the control unit 121. More specifically, by that the information processing device 100 includes a functional configuration (not illustrated) capable of outputting time data (or is capable of communicating with a device capable of outputting time data), in a case where the data obtaining unit 112 has received the notification, the data obtaining unit 112 can obtain time data of reception timing thereof from the functional configuration. As described above, since the notification is performed at timing when a process has been performed by the secure element 120, the data obtaining unit 112 can obtain data related to timing of the process by the secure element 120 by the process. As described above, although the secure element 120 cannot obtain data related to timing of a process, various functions become possible by the data obtaining unit 112 obtaining data related to timing of a process by the process. Details will be described later. Note that the functional configuration capable of outputting time data may be, for example, a clock or the like, but is not limited thereto. Furthermore, instead of obtaining the time data of reception timing of the notification, the data obtaining unit 112 may obtain time data of timing when the notification is predicted to be transmitted by the control unit 121, or may obtain time data on the basis of data included in the notification (in a case where the notification includes data related to timing of a process).

Furthermore, without being limited to the data related to timing of a process, the data obtaining unit 112 may obtain arbitrary data that the secure element 120 cannot obtain from outside the secure element 120. For example, by that the information processing device 100 includes a functional configuration (not illustrated) capable of outputting data related to the position of an own device, data related to a surrounding situation of the position (for example, environmental sound data, peripheral image data, and the like), data related to the user of the own device, data related to operation of the own device or action of the user, or the like (or is capable of communicating with a device capable of outputting these data), in a case where the data obtaining unit 112 has received the notification, the data obtaining unit 112 can obtain these data from this functional configuration at reception timing thereof.

Thus, the data obtaining unit 112 can know the position of the own device, the surrounding situation of the position, the user of the own device, or the operation of the own device or the action of the user, or the like at timing when a process has been performed by the secure element 120. As described above, the secure element 120 cannot obtain these data, but various functions become possible by the data obtaining unit 112 obtaining these data by the process. Note that data obtained by the data obtaining unit 112 is not limited to the above. Furthermore, the data obtaining unit 112 may determine whether or not the secure element 120 can obtain each piece of data described above, and obtain each piece of data only in the case of determining that the secure element 120 cannot obtain each piece of data described above.

Here, the functional configuration capable of outputting data related to the position of the information processing device 100 is, for example, a global navigation satellite system (GNSS) sensor (including a global positioning system (GPS) sensor) capable of outputting latitude data, longitude data, or altitude data, a barometric pressure sensor capable of outputting altitude data, or the like but is not limited thereto. For example, a functional configuration capable of estimating the position of the information processing device 100 on the basis of sensing data of a motion sensor (including an acceleration sensor, a gyro sensor, or the like) or the like may be used. Further, the functional configuration capable of outputting data related to the surrounding situation of the position of the information processing device 100 may be, for example, a microphone capable of obtaining surrounding environmental sound, a camera capable of outputting a surrounding image, or the like, but is not limited thereto. Furthermore, the functional configuration capable of outputting data related to the user of the own device may be a functional configuration capable of implementing, for example, user authentication by a predetermined method (for example, biometric authentication such as fingerprint authentication, iris authentication, or vein authentication, password authentication, or the like), or a functional configuration capable of implementing user estimation by a predetermined method (for example, user estimation based on biological data including pulse data and the like), but is not limited thereto. Moreover, the functional configuration capable of outputting data related to operation of the own device or action of the user may be, for example, a motion sensor (including an acceleration sensor, a gyro sensor, or the like) or the like, but is not limited thereto.

The data obtaining unit 112 provides the control unit 111 with data related to a process obtained from the secure element 120 and data related to timing of a process or the like obtained from outside the secure element 120.

(Control Unit 111)

The control unit 111 associates data related to a process obtained from the secure element 120 with data related to timing of the process or the like obtained from outside the secure element 120, and uses these data for various kinds of processes.

Describing more specifically, the data related to the process obtained from the secure element 120 includes a hash value of process target data as illustrated in FIG. 4. Therefore, the control unit 111 first calculates a hash value using the obtained process target data, and confirms that the hash value matches a hash value obtained from the second storage unit 123, so as to verify integrity of the process target data. If the hash value calculated using the process target data does not match the hash value obtained from the second storage unit 123, the control unit 111 may determine that the process target data may have been tampered and stop a subsequent process.

In a case where the verification of integrity of the process target data is successful, the control unit 111 stores the data related to the process obtained from the secure element 120 and the data related to timing of the process or the like obtained from outside the secure element 120 in association with each other in the storage unit 113. Here, an example of data stored in the storage unit 113 will be described with reference to FIG. 5. In FIG. 5, data 10 is data related to a process obtained from the secure element 120, and the control unit 111 stores the data 10 in the storage unit 113 in association with data 20 related to timing of the process or the like obtained from outside the secure element 120.

Then, for example, the control unit 111 causes the output unit 115 to output the process target data by a predetermined method. More specifically, in a case where the process performed by the secure element 120 is a price settlement process, the control unit 111 may cause the output unit 115 to output data related to a price settlement amount or balance included in the process target data. Further, in a case where the process performed by the secure element 120 is a use process or obtaining process of a coupon, the control unit 111 may cause the output unit 115 to output data related to the coupon included in the process target data. Furthermore, in a case where the process performed by the secure element 120 is an electronic money charging process, the control unit 111 may cause the output unit 115 to output data related to a charge amount included in the process target data. Moreover, in a case where the process performed by the secure element 120 is a process of obtaining campaign data, the control unit 111 may cause the output unit 115 to output campaign data included in the process target data.

Through these processes, after causing the information processing device 100 to perform various processes by holding the information processing device 100 over the reader-writer 300, for example, the user can confirm results of the processes and the like by an output from the output unit 115. Note that the control by the control unit 111 is not limited to the above. For example, even if the verification of integrity of the process target data fails, the control unit 111 may control the output and the like by the output unit 115 without stopping a subsequent process.

Furthermore, the control unit 111 may perform the above process using not only the process target data, but also data related to timing of a process or the like obtained from outside the secure element 120. More specifically, when causing the output unit 115 to perform an output, the control unit 111 may also cause the output unit 115 to output together data related to timing of a process, data related to the position of the own device, data related to the surrounding situation of the position, data related to the user of the own device, or data related to operation of the own device or action of the user, or the like, or output the result of a predetermined process using these data. For example, the control unit 111 may cause the output unit 115 to output together not only the data related to the price settlement amount or balance included in the process target data, but also timing (for example, date and time) when the price settlement process has been performed, a position (for example, store) thereof, or the like obtained from outside the secure element 120.

Through these processes, the user can know more abundant information. Furthermore, the control unit 111 may cause the output unit 115 to output together arbitrary data obtained from outside the secure element 120 other than the above.

Furthermore, the control unit 111 may provide the server 200 with data in which data related to a process obtained from the secure element 120 and data related to timing of the process or the like obtained from outside the secure element 120 are associated. Thus, by accumulating and statistically analyzing these data, the server 200 can output action history data, preference data, and the like of the user of the information processing device 100, and provide various services on the basis of these data.

Furthermore, the control unit 111 may control a process generally performed in any one of information processing devices including a general-purpose computer, a PC, a laptop PC, a tablet PC, any wearable terminal, a portable media playback device, a portable game device, and the like.

(Storage Unit 113)

The storage unit 113 is a functional configuration that stores various data. For example, as described with reference to FIG. 5, the storage unit 113 stores data in which data related to a process obtained from the secure element 120 and data related to timing of the process or the like obtained from outside the secure element 120 are associated, and the like. Furthermore, the storage unit 113 stores a program or a parameter or the like used by each functional configuration of the device host 110. Note that the contents of data stored in the storage unit 113 are not limited thereto.

(Input Unit 114)

The input unit 114 is a functional configuration that receives an input by the user. For example, the input unit 114 receives inputs performed by the user using various input units (not illustrated. For example, a mouse, a keyboard, a touch panel, a button, a switch, a microphone, or the like). The input unit 114 implements various processes by the control unit 111 by providing input contents to the control unit 111. Note that the input unit is not limited to the above.

(Output Unit 115)

The output unit 115 is a functional configuration that outputs various data. For example, the output unit 115 can cause various output units (not illustrated. For example, a display unit such as a display or an audio output unit such as a speaker) to output various data. More specifically, as described above, on the basis of control by the control unit 111, the output unit 115 outputs process target data, data related to timing of a process, or the like obtained from outside the secure element 120, or the like (by displaying on a display, outputting by audio, or the like). Note that the output unit is not limited to the above.

(Communication Unit 116)

The communication unit 116 is a functional configuration that performs various types of communication with an external device including the server 200. For example, to the server 200, the communication unit 116 may transmit a wireless signal including data in which data related to a process obtained from the secure element 120 and data related to timing of the process or the like obtained from outside the secure element 120 are associated. Further, the communication unit 116 may receive a wireless signal including arbitrary data used for processing by the device host 110 or the secure element 120 from the server 200. Note that data to be communicated by the communication unit 116 and cases to communicate are not limited thereto. Furthermore, as described above, the communication method between the communication unit 116 and the server 200 is not particularly limited.

The functional configuration example of the device host 110 has been described above. Note that the above functional configuration described with reference to FIG. 2 is merely an example, and the functional configuration of the device host 110 is not limited to this example. For example, the device host 110 does not necessarily need to include the whole of the configuration illustrated in FIG. 2. In addition, the functional configuration of the device host 110 can be flexibly transformed according to specifications and operation.

2.4. Examples of Process Flows

In the foregoing, the functional configuration example of the device host 110 has been described. Next, examples of process flows in the information processing system will be described.

First, with reference to FIG. 6, an example of a process flow performed along with short-range wireless communication between the information processing device 100 and the reader-writer 300 will be described.

First, as the user holds the information processing device 100 over the reader-writer 300, the information processing device 100 enters a range where it can receive carrier waves emitted from the reader-writer 300. Then, in step S1000, the reader-writer 300 transmits a wireless signal including update request information for data stored in first storage unit 122 of the secure element 120. In step S1004, the CLF 130 receives the wireless signal from the reader-writer 300, and provides the update request information included in the wireless signal to the secure element 120. Then, the control unit 121 of the secure element 120 updates the data stored in the first storage unit 122 on the basis of the update request information. Then, on the basis of a notification of update completion being received from the first storage unit 122 in step S1008, the control unit 121 stores data related to the process in the second storage unit 123 in step S1012. In step S1016, the control unit 121 receives a notification of storage completion from the second storage unit 123.

In step S1020, the reader-writer 300 stops transmitting the carrier waves (or the information processing device 100 goes out of the range where it can receive the carrier waves emitted from reader-writer 300). Thus, in step S1024, the control unit 121 of the secure element 120 recognizes an end of process and notifies the device host 110 of the end of process.

In step S1028, the data obtaining unit 112 of the device host 110 requests a clock, various sensors, or the like to provide various data that the secure element 120 cannot obtain (for example, data related to timing of the process or the like) on the basis of the notification of the end of process. In step S1032, the clock, various sensors, or the like obtains various data in response to the request and provides the data to the data obtaining unit 112.

In step S1036, the data obtaining unit 112 generates request information of data related to the process, and provides the information to the secure element 120. In step S1040 and step S1044, the control unit 121 of the secure element 120 obtains all data related to the process stored in the second storage unit 123 on the basis of the information. In step S1048, the control unit 121 provides the data related to the process to the device host 110.

In step S1052, the control unit 111 of the device host 110 verifies integrity of process target data included in the data related to the process. More specifically, the control unit 111 calculates a hash value using the process target data, and confirms that the hash value matches a hash value included in the data related to the process, to thereby verify integrity of the process target data. In a case where the verification of integrity of the process target data is successful, in step S1056, the control unit 111 stores the data related to the process obtained from the secure element 120 and various data obtained from outside the secure element 120 in association with each other in the storage unit 113. In step S1060, the control unit 111 receives a notification of storage completion from the storage unit 113, and the series of processes ends. Note that although not illustrated, the control unit 111 may perform the various processes described above using the data related to the processes associated with each other or the various data obtained from outside the secure element 120.

Thus, the information processing device 100 can provide useful data to the user. More specifically, the information processing device 100 can provide the user with not only process target data but also data related to timing of a process or the like that the secure element 120 cannot obtain.

Next, an example of a process flow performed along with communication between the information processing device 100 and the server 200 will be described with reference to FIG. 7.

In step S1100, the server 200 transmits to the device host 110 a wireless signal including update request information for data stored in the first storage unit 122 of the secure element 120. For example, the server 200 transmits a wireless signal including request information related to electronic money charging to the device host 110.

In step S1104, the control unit 111 of the device host 110 provides the update request information for data included in the received wireless signal to the secure element 120. In step S1108, the control unit 121 of the secure element 120 updates the data stored in the first storage unit 122 on the basis of the update request information, thereby achieving electronic money charging or the like. Then, on the basis of a notification of update completion being received from the first storage unit 122 in step S1112, the control unit 121 stores data related to the process in the second storage unit 123 in step S1116. In step S1120, the control unit 121 receives a notification of storage completion from the second storage unit 123.

In step S1124, the control unit 121 recognizes an end of process and notifies the device host 110 of the end of process. The process of steps S1128 to S1160 performed thereafter is the same as the process of steps S1028 to S1060 in FIG. 6, and a description thereof will be omitted.

Figure 6:
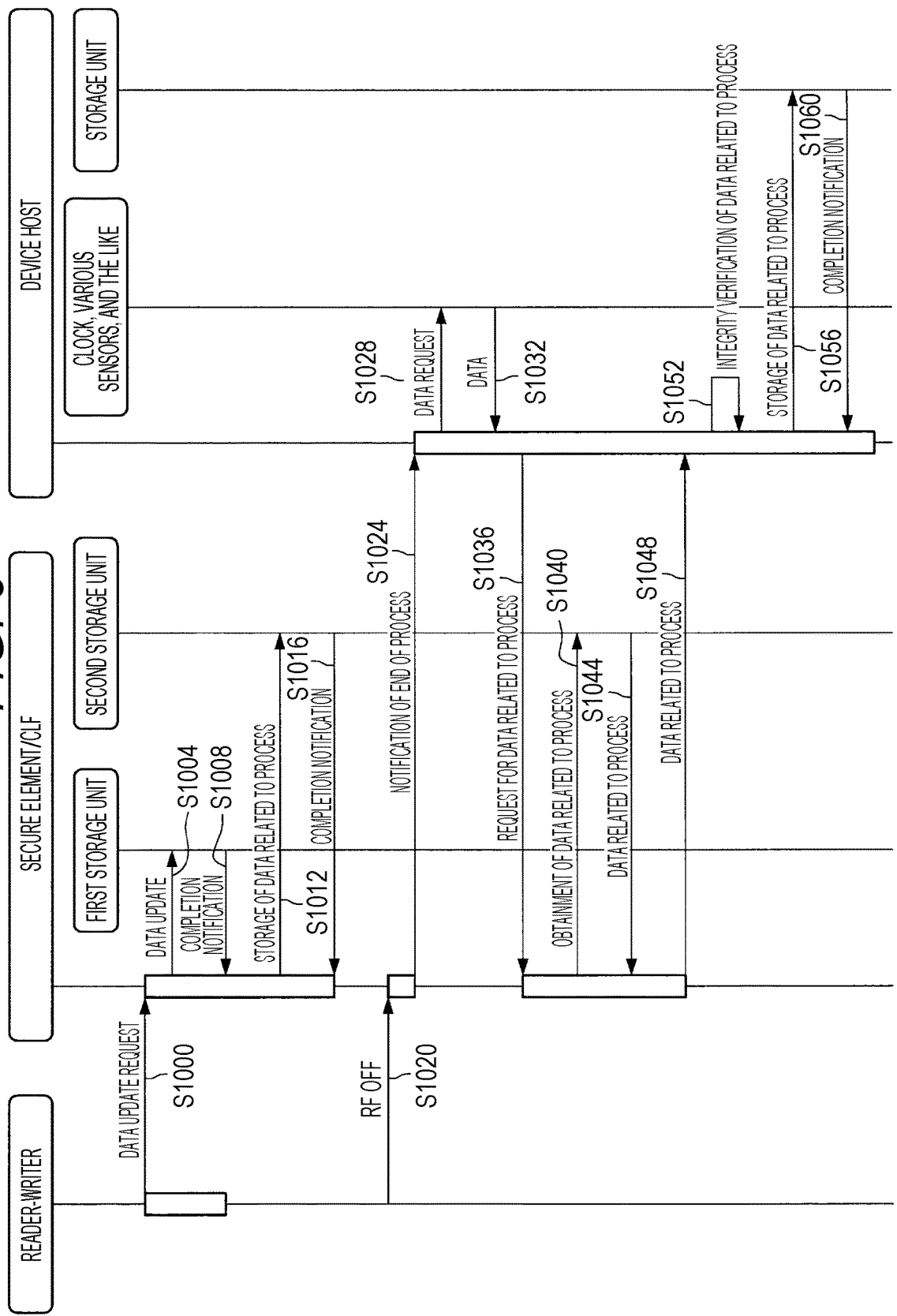
FIG. 6 is a sequence diagram illustrating an example of a process flow performed along with short-range wireless communication between the information processing device 100 and a reader-writer 300.
Figure 7:
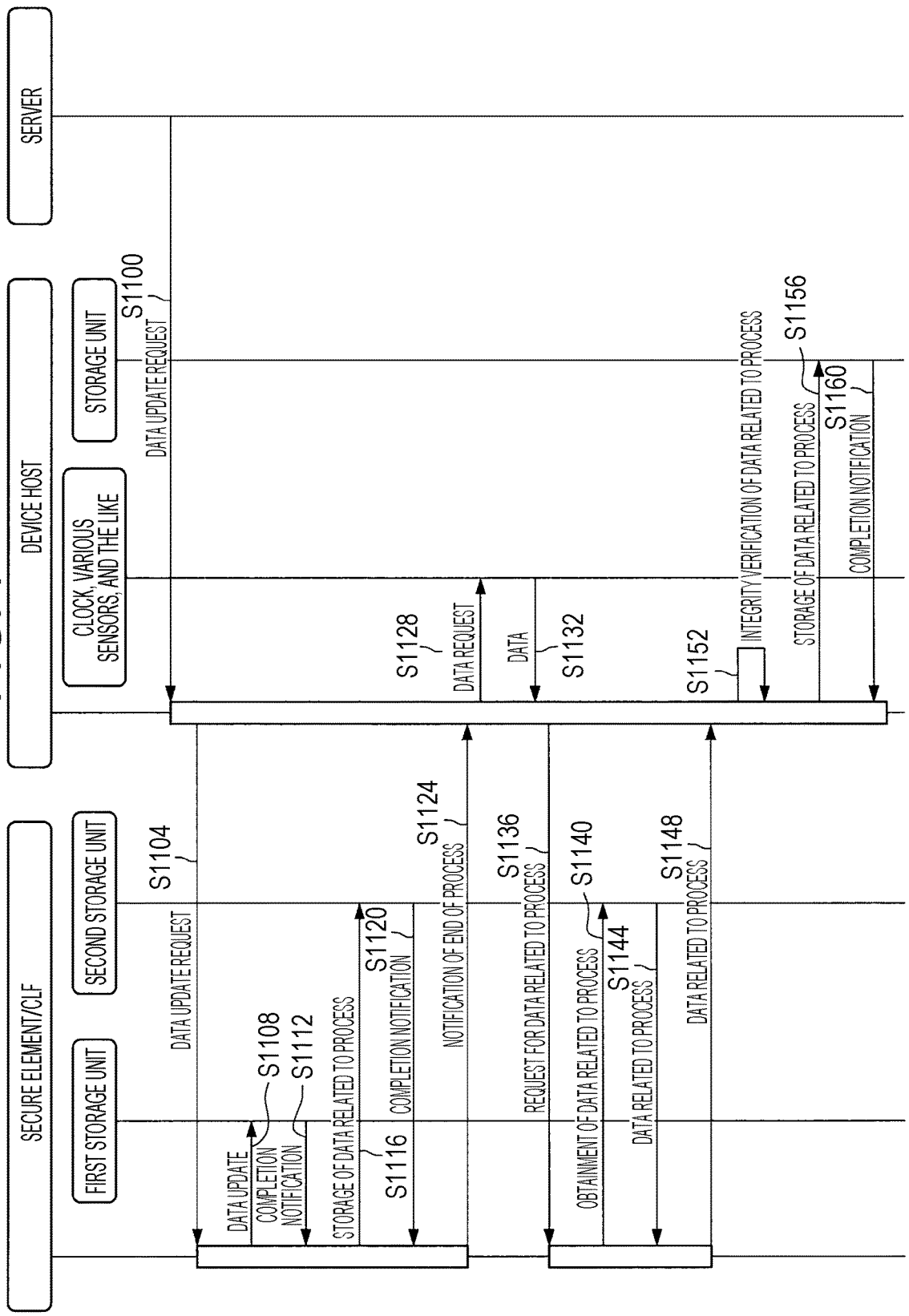
FIG. 7 is a sequence diagram illustrating an example of a process flow performed along with communication between the information processing device 100 and a server 200.

Note that the respective steps in the sequence diagrams illustrated in FIGS. 6 and 7 do not necessarily need to be processed in chronological order in the order described. That is, each step in the sequence diagrams may be processed in an order different from the described order, or may be processed in parallel.

2.5. Hardware Configuration Example of Information Processing Device 100

The example of the process flows in the information processing system has been described above. Next, a hardware configuration example of the information processing device 100 will be described with reference to FIG. 8. The various processes described above are achieved by cooperation between software and hardware described below.

Figure 8:
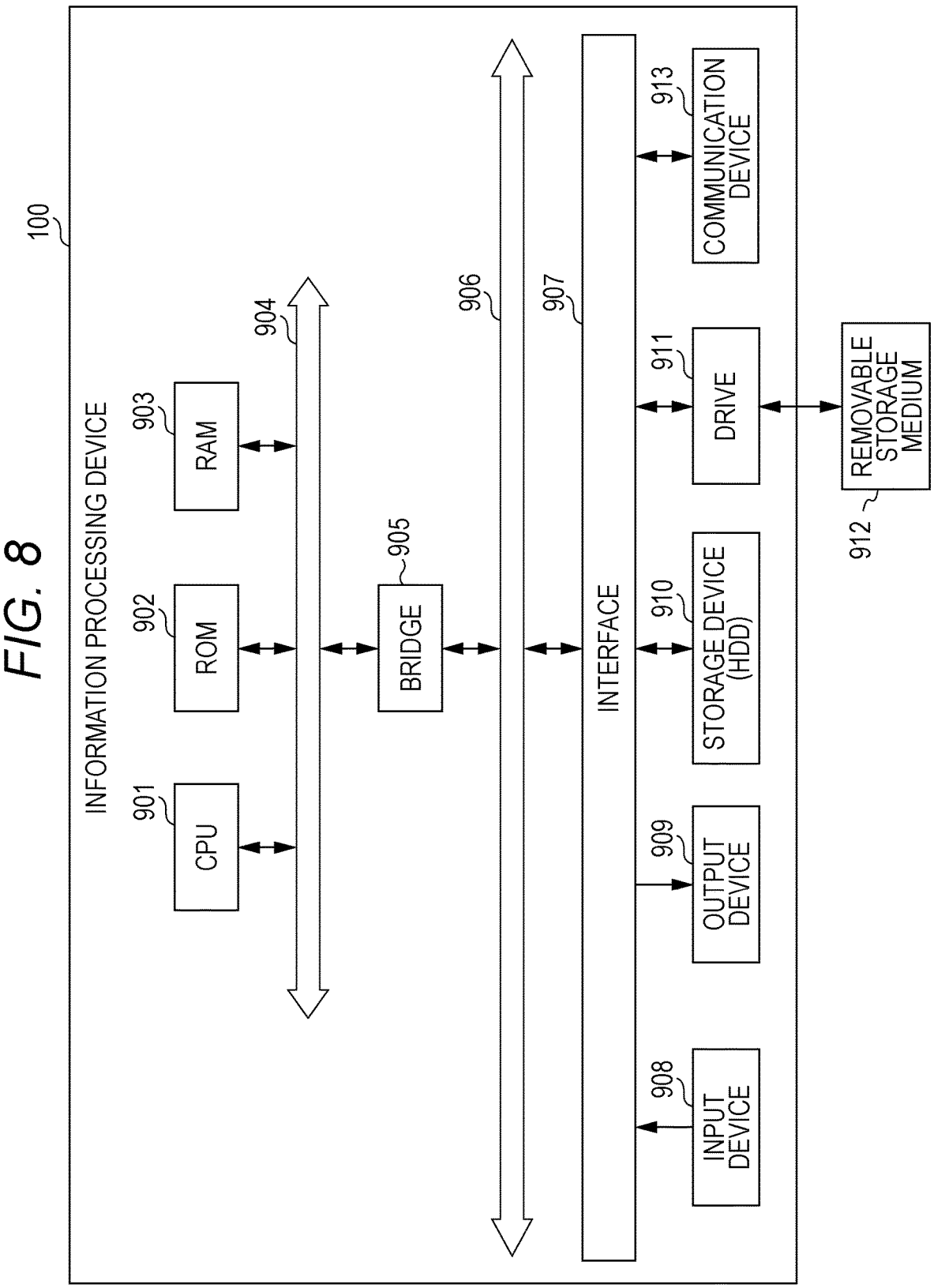
FIG. 8 is a block diagram illustrating a hardware configuration example of the information processing device 100.

FIG. 8 is a block diagram illustrating a hardware configuration example of the information processing device 100. The information processing device 100 includes a central processing unit (CPU) 901, a read only memory (ROM) 902, a random access memory (RAM) 903, a host bus 904, a bridge 905, an external bus 906, an interface 907, an input device 908, an output device 909, a storage device (HDD) 910, a drive 911, and a communication device 912.

The CPU 901 functions as an arithmetic processing device and a control device, and controls overall operation of the information processing device 100 according to various programs. Furthermore, the CPU 901 may be a microprocessor. The ROM 902 stores programs and calculation parameters and the like used by the CPU 901. The RAM 903 temporarily stores a program used in execution by the CPU 901, parameters that change as appropriate during the execution, and the like. These are connected to each other via the host bus 904 including a CPU bus or the like. The functions of the control unit 111 or the data obtaining unit 112 of the device host 110 or the control unit 121 of the secure element 120 are implemented by cooperation of the CPU 901, the ROM 902, and the RAM 903.

The host bus 904 is connected to the external bus 906 such as a peripheral component interconnect/interface (PCI) bus via the bridge 905. Note that the host bus 904, the bridge 905, and the external bus 906 are not necessarily configured separately, and their functions may be mounted on one bus.

The input device 908 includes a mouse, a keyboard, a touch panel, a button, a microphone, a switch, a lever, and the like, and is used by the user to input various data. The input device 908 includes an input control circuit that generates an input signal on the basis of an input from the user and outputs the input signal to the CPU 901, and the like. To the input unit 114 of the device host 110, the input signal generated by the input device 908 is input.

For example, the output device 909 includes display devices such as a cathode ray tube (CRT) display device, a liquid crystal display (LCD) device, an organic light emitting diode (OLED) device, and a lamp. Moreover, the output device 909 includes an audio output device such as a speaker and headphones. The output device 909 displays various data such as video data by an image or a text. On the other hand, the audio output device converts audio data and the like into audio and outputs the audio. The function of the output unit 115 of the device host 110 is implemented by the output device 909.

The storage device 910 is a device for storing data configured as an example of the storage unit 113 of the device host 110, or the first storage unit 122 or the second storage unit 123 of the secure element 120. The storage device 910 may include a storage medium, a recording device that records data on the storage medium, a reading device that reads data from the storage medium, a deletion device that deletes data recorded on the storage medium, and the like. The storage device 910 includes, for example, a hard disk drive (HDD). The storage device 910 drives a hard disk and stores programs executed by the CPU 901 and various data.

The drive 911 is a reader-writer for a storage medium, and is built in or externally attached to the information processing device 100. The drive 911 reads information recorded on a removable storage medium 913 such as a magnetic disk, an optical disk, a magneto-optical disk, or a semiconductor memory mounted, and outputs the information to the RAM 903. Furthermore, the drive 911 can also write information to the removable storage medium 913.

The communication device 912 is, for example, a communication interface including a communication device for connecting to the communication network 914, or the like. The function of the communication unit 116 of the device host 110 or the CLF 130 is achieved by the communication device 912.

Note that the hardware configuration of the information processing device 100 is not limited to the configuration illustrated in FIG. 8. For example, the information processing device 100 does not need to include the communication device 912 in a case of performing communication via an external communication device connected thereto. Furthermore, the communication device 912 may be capable of performing communication by a plurality of communication methods.

3. SUMMARY

As described above, in a case where the secure element 120 has performed a process using data of the first storage unit 122, the secure element 120 according to the present disclosure stores data related to the process in the second storage unit 123, and provides a predetermined notification to the device host 110. Then, the device host 110 can appropriately know the contents of the process by obtaining the data related to the process from the second storage unit 123 on the basis of the notification.

Furthermore, on the basis of the notification, the device host 110 obtains arbitrary data that the secure element 120 cannot obtain and includes data related to timing of the process or the like, from outside the secure element 120. Thus, the device host 110 can perform various processes using the data related to the process obtained from the secure element 120, the data related to the timing of the process obtained from outside the secure element 120, and the like.

The preferred embodiments of the present disclosure have been described above in detail with reference to the accompanying drawings, but the technical scope of the present disclosure is not limited to such examples. It is apparent that a person having ordinary knowledge in the technical field of the present disclosure can devise various change examples or modification examples within the scope of the technical idea described in the claims, and it will be naturally understood that they also belong to the technical scope of the present disclosure.

Furthermore, the effects described in the present description are merely illustrative or exemplary and are not limited. That is, the technology according to the present disclosure can exhibit other effects that are apparent to those skilled in the art from the present description in addition to or instead of the above effects.

Note that configurations as follows also belong to the technical scope of the present disclosure.

(1)

An information processing device including:

a data obtaining unit that, on the basis of a notification from a protection storage unit, obtains data related to timing of a process by the protection storage unit; and a control unit that associates the data related to the timing of the process with data related to the process.

(2)

The information processing device according to above (1), in which the data obtaining unit obtains the data related to the timing of the process from outside the protection storage unit.

(3)

The information processing device according to above (2), in which the data obtaining unit obtains data related to a position of the protection storage unit at the timing of the process, data related to a surrounding situation of the position, data related to a user of the protection storage unit, or data related to operation of the protection storage unit or action of the user together from outside the protection storage unit.

(4)

The information processing device according to any one of above (1) to (3), in which the data obtaining unit obtains the data related to the process from the protection storage unit.

(5)

The information processing device according to above (4), in which the protection storage unit includes a first storage unit that stores target data of the process, and a second storage unit that stores the data related to the process, and the data obtaining unit obtains the data related to the process from the second storage unit.

(6)

The information processing device according to above (5), in which the protection storage unit stores the target data of the process which is stored in the first storage unit after the process, in the second storage unit as the data related to the process.

(7)

The information processing device according to above (6), in which the protection storage unit controls storage of the data related to the process in the second storage unit on the basis of contents of the process.

(8)

The information processing device according to above (7), in which in a case where the contents of the process include update of data, the protection storage unit stores the data related to the process in the second storage unit.

(9)

The information processing device according to above (7), in which in a case where the contents of the process include only reading of data, the protection storage unit does not store the data related to the process in the second storage unit.

(10)

The information processing device according to above (6), in which the protection storage unit controls storage of the data related to the process in the second storage unit on the basis of presence or absence of a storage area in which the target data of the process is stored or encryption of the target data of the process.

(11)

The information processing device according to above (10), in which in a case where the target data of the process is stored in a storage area for encrypted data in the first storage unit, or in a case where the target data of the process is encrypted, the protection storage unit does not store the data related to the process in the second storage unit.

(12)

The information processing device according to any one of above (6) to (11), in which the protection storage unit calculates a hash value of the target data of the process, and stores the target data of the process and the hash value in the second storage unit as the data related to the process.

(13)

The information processing device according to any one of above (1) to (12), in which the protection storage unit performs the process along with short-range wireless communication with an external device.

(14)

The information processing device according to any one of above (1) to (13), in which the notification is performed at timing when the process has ended, at timing when the process has been started, or at timing when execution of the process is expected.

(15)

The information processing device according to any one of above (1) to (14), in which the protection storage unit includes a secure element, and the information processing device includes a device host.

(16)

An information processing method executed by a computer, the method including:

on the basis of a notification from a protection storage unit, obtaining data related to timing of a process by the protection storage unit; and associating the data related to the timing of the process with data related to the process.

REFERENCE SIGNS LIST

100 Information processing device
110 Device host
111 Control unit
112 Data obtaining unit
113 Storage unit
114 Input unit
115 Output unit
116 Communication unit
120 Secure element
121 Control unit
122 First storage unit
123 Second storage unit
130 CLF
200 Server
300 Reader-writer

The invention claimed is:

1. An information processing device comprising:
a data obtaining unit configured to
obtain, based on a notification from a protection storage unit, data related to timing of a process by the protection storage unit, and
obtain data related to the process; and
a control unit configured to store the obtained data related to the timing of the process and the obtained data related to the process in association with each other in a device storage unit,
wherein the notification from the protection storage unit includes a type of importance of the process,
wherein the data related to the timing of the process and the data related to the process are obtained from different data sources, wherein the data obtaining unit and the control unit are each implemented via at least one processor, and wherein the protection storage unit and the device storage unit are each implemented via at least one non-transitory computer-readable storage medium.

2. The information processing device according to claim 1, wherein the data obtaining unit obtains the data related to the timing of the process from outside the protection storage unit.

3. The information processing device according to claim 2, wherein the data obtaining unit is further configured to obtain data related to a position of the protection storage unit at the timing of the process, data related to a surrounding situation of the position, data related to a user of the protection storage unit, or data related to operation of the protection storage unit or action of the user together from outside the protection storage unit.

4. The information processing device according to claim 1, wherein the data obtaining unit obtains the data related to the process from the protection storage unit.

5. The information processing device according to claim 4, wherein the protection storage unit includes
a first storage unit configured to store target data of the process, and
a second storage unit configured to store the data related to the process, and
wherein the data obtaining unit obtains the data related to the process from the second storage unit.

6. The information processing device according to claim 5, wherein the protection storage unit is configured to store, after the process is completed, the target data of the process which is stored in the first storage unit in the second storage unit as the data related to the process.

7. The information processing device according to claim 6, wherein the protection storage unit controls storage of the data related to the process in the second storage unit based on contents of the process.

8. The information processing device according to claim 7, wherein in a case where the contents of the process include update of data, the protection storage unit stores the data related to the process in the second storage unit.

9. The information processing device according to claim 7, wherein in a case where the contents of the process include only reading of data, the protection storage unit does not store the data related to the process in the second storage unit.

10. The information processing device according to claim 6, wherein the protection storage unit controls storage of the data related to the process in the second storage unit based on presence or absence of a storage area in which the target data of the process is stored or encryption of the target data of the process.

11. The information processing device according to claim 10, wherein in a case where the target data of the process is stored in a storage area for encrypted data in the first storage unit, or in a case where the target data of the process is encrypted, the protection storage unit does not store the data related to the process in the second storage unit.

12. The information processing device according to claim 6, wherein the protection storage unit is further configured to
calculate a hash value of the target data of the process, and
store the target data of the process and the hash value in the second storage unit as the data related to the process.

13. The information processing device according to claim 1, wherein the protection storage unit is configured to perform the process along with short-range wireless communication with an external device.

14. The information processing device according to claim 1, wherein the notification is performed at timing when the process has ended, at timing when the process has been started, or at timing when execution of the process is expected.

15. The information processing device according to claim 1, wherein the protection storage unit includes a secure element, and
wherein the information processing device includes a device host.

16. The information processing device according to claim 1, wherein the data obtaining unit obtains the data related to the process according to the type of importance of the process in order to obtain data with higher importance preferentially.

17. An information processing method executed by a computer, the method comprising:

obtaining, based on a notification from a protection storage unit, data related to timing of a process by the protection storage unit;

obtaining data related to the process; and storing the obtained data related to the timing of the process and the obtained data related to the process in association with each other in a device storage unit, wherein the notification from the protection storage unit includes a type of importance of the process, wherein the data related to the timing of the process and the data related to the process are obtained from different data sources, and wherein the protection storage unit and the device storage unit are each implemented via at least one non-transitory computer-readable storage medium.

* * * * *